(12) United States Patent
Roim Ferreira et al.

(10) Patent No.: US 11,405,347 B1
(45) Date of Patent: Aug. 2, 2022

(54) SYSTEMS AND METHODS FOR PROVIDING GAME-RELATED CONTENT

(71) Applicant: Meta Platforms, Inc., Menlo Park, CA (US)

(72) Inventors: Rodrigo Roim Ferreira, Bellevue, WA (US); Marcos Arribas, Seattle, WA (US); Kun Chen, Bellevue, WA (US); Olivier Marie Bouan Du Chef Du Bos, San Francisco, CA (US); Jiakan Wang, Issaquah, WA (US); Jihoon Suh, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 2 days.

(21) Appl. No.: 16/450,137

(22) Filed: Jun. 24, 2019

Related U.S. Application Data

(60) Provisional application No. 62/855,744, filed on May 31, 2019.

(51) Int. Cl.
| | | |
|---|---|---|
| *G06Q 40/00* | (2012.01) | |
| *G06F 9/44* | (2018.01) | |
| *G06F 9/445* | (2018.01) | |
| *H04N 7/088* | (2006.01) | |
| *H04L 15/16* | (2006.01) | |
| *G06F 15/16* | (2006.01) | |
| *H04L 51/52* | (2022.01) | |
| *H04L 51/10* | (2022.01) | |
| *H04L 51/18* | (2022.01) | |
| *G06F 16/958* | (2019.01) | |
| *A63F 13/85* | (2014.01) | |

(Continued)

(52) U.S. Cl.
CPC .............. *H04L 51/32* (2013.01); *A63F 13/85* (2014.09); *G06F 16/958* (2019.01); *H04L 51/10* (2013.01); *H04L 51/18* (2013.01); *H04L 65/4069* (2013.01); *A63F 13/86* (2014.09); *A63F 2300/577* (2013.01)

(58) Field of Classification Search
CPC ..... H04L 51/32; H04L 65/4069; H04L 51/18; H04L 51/10; A63F 13/85; A63F 13/86; A63F 2300/577; G06F 16/958
USPC ........................................................ 709/218
See application file for complete search history.

(56) References Cited

U.S. PATENT DOCUMENTS

| | | | | |
|---|---|---|---|---|
| 8,550,920 B1 * | 10/2013 | Allen | .................. | G07F 17/3241 463/25 |
| 10,977,297 B1 * | 4/2021 | Tang | ...................... | G06N 20/00 |
| 11,206,235 B1 * | 12/2021 | Sarkar | ................... | H04L 65/605 |

(Continued)

FOREIGN PATENT DOCUMENTS

| | | | | |
|---|---|---|---|---|
| WO | WO-2012112672 A9 * | 12/2012 | ......... | G07F 17/3288 |
| WO | WO-2013111249 A1 * | 8/2013 | ............. | H04L 67/06 |

(Continued)

*Primary Examiner* — David R Lazaro
*Assistant Examiner* — Berhanu Shitayewoldetadik
(74) *Attorney, Agent, or Firm* — Sheppard Mullin Richter & Hampton LLP

(57) ABSTRACT

Systems, methods, and non-transitory computer-readable media can receive gameplay information associated with a first user playing a game on a computing device. Game-related content is generated based on the gameplay information. The game-related content is published to an ephemeral content feed on a social networking system.

20 Claims, 11 Drawing Sheets

(51) Int. Cl.
*H04L 65/61* (2022.01)
*A63F 13/86* (2014.01)

(56) References Cited

U.S. PATENT DOCUMENTS

| | | | | |
|---|---|---|---|---|
| 2002/0059252 | A1* | 5/2002 | Yamaguchi | A63F 13/12 |
| 2006/0046807 | A1* | 3/2006 | Sanchez | A63F 13/12 |
| | | | | 463/9 |
| 2006/0121990 | A1* | 6/2006 | O'Kelley, II | A63F 13/537 |
| | | | | 463/42 |
| 2006/0247055 | A1* | 11/2006 | O'Kelley, II | G07F 17/3262 |
| | | | | 463/42 |
| 2006/0287099 | A1* | 12/2006 | Shaw | H04L 67/38 |
| | | | | 463/42 |
| 2007/0293321 | A1* | 12/2007 | Horowitz | A63F 9/24 |
| | | | | 463/42 |
| 2008/0031592 | A1* | 2/2008 | Harrington | G06Q 30/02 |
| | | | | 386/248 |
| 2008/0092233 | A1* | 4/2008 | Tian | H04L 67/24 |
| | | | | 726/21 |
| 2008/0227553 | A1* | 9/2008 | Leifenberg | A63F 13/12 |
| | | | | 463/42 |
| 2009/0325715 | A1* | 12/2009 | Kelly | G07F 17/3244 |
| | | | | 463/42 |
| 2012/0004039 | A1* | 1/2012 | Perry | A63F 13/335 |
| | | | | 463/42 |
| 2012/0004041 | A1* | 1/2012 | Pereira | A63F 13/352 |
| | | | | 463/42 |
| 2012/0005316 | A1* | 1/2012 | Perry | H04L 65/4069 |
| | | | | 709/219 |
| 2012/0009987 | A1* | 1/2012 | Dumont | G07F 17/329 |
| | | | | 463/19 |
| 2012/0108320 | A1* | 5/2012 | Ye | A63F 13/87 |
| | | | | 463/25 |
| 2012/0271884 | A1* | 10/2012 | Holmes | G06Q 30/02 |
| | | | | 709/204 |
| 2012/0283023 | A1* | 11/2012 | O'Kelley, II | G07F 17/3276 |
| | | | | 463/42 |
| 2013/0031034 | A1* | 1/2013 | Gubin | G06Q 50/01 |
| | | | | 706/12 |
| 2013/0053142 | A1* | 2/2013 | Kress | A63F 13/61 |
| | | | | 463/31 |
| 2013/0260896 | A1* | 10/2013 | Miura | A63F 13/86 |
| | | | | 463/42 |
| 2013/0346876 | A1* | 12/2013 | Yerli | H04L 65/403 |
| | | | | 715/753 |
| 2014/0018137 | A1* | 1/2014 | Flaherty | G07F 17/3276 |
| | | | | 463/11 |
| 2014/0179428 | A1* | 6/2014 | Miura | A63F 13/23 |
| | | | | 463/31 |
| 2014/0194207 | A1* | 7/2014 | Yim | G07F 17/3272 |
| | | | | 463/40 |
| 2015/0024839 | A1* | 1/2015 | Zahn | H04N 21/2343 |
| | | | | 463/31 |
| 2015/0050998 | A1* | 2/2015 | Stelovsky | A63F 13/71 |
| | | | | 463/31 |
| 2015/0088624 | A1* | 3/2015 | Frederick | G06Q 30/0209 |
| | | | | 705/14.12 |
| 2015/0099586 | A1* | 4/2015 | Huang | A63F 13/87 |
| | | | | 463/40 |
| 2015/0128014 | A1* | 5/2015 | Monroe | G06F 3/0482 |
| | | | | 715/202 |
| 2015/0199122 | A1* | 7/2015 | Garmark | H04L 65/4092 |
| | | | | 715/716 |
| 2016/0136526 | A1* | 5/2016 | Mansfield | A63F 13/79 |
| | | | | 463/31 |
| 2016/0285816 | A1* | 9/2016 | Schmid | H04L 67/306 |
| 2016/0366197 | A1* | 12/2016 | Dharmaji | G06Q 50/01 |
| 2017/0026328 | A1* | 1/2017 | Adkins | H04L 51/16 |
| 2017/0124812 | A1* | 5/2017 | Washington | G07F 17/3248 |
| 2017/0165569 | A1* | 6/2017 | van Welzen | A63F 13/30 |
| 2018/0001216 | A1* | 1/2018 | Bruzzo | A63F 13/33 |
| 2018/0006836 | A1* | 1/2018 | Chi | H04L 12/1822 |
| 2018/0034818 | A1* | 2/2018 | Choi | H04L 51/32 |
| 2018/0104587 | A1* | 4/2018 | Zachwieja | A63F 13/86 |
| 2018/0178132 | A1* | 6/2018 | Ahlstrom | A63F 13/87 |
| 2018/0241871 | A1* | 8/2018 | Sarafa | H04L 51/18 |
| 2018/0295175 | A1* | 10/2018 | Smith | H04L 65/4069 |
| 2018/0296929 | A1* | 10/2018 | Vaccari | A63F 13/92 |
| 2018/0350144 | A1* | 12/2018 | Rathod | G06T 13/40 |
| 2018/0367483 | A1* | 12/2018 | Rodriguez | H04L 51/046 |
| 2018/0367484 | A1* | 12/2018 | Rodriguez | H04L 67/36 |
| 2019/0068526 | A1* | 2/2019 | Xie | H04L 67/20 |
| 2019/0192974 | A1* | 6/2019 | Eatedali | A63F 13/792 |
| 2019/0197835 | A1* | 6/2019 | Keilwert | G06F 3/048 |
| 2019/0207900 | A1* | 7/2019 | Olinger | H04L 51/32 |
| 2019/0208027 | A1* | 7/2019 | Olinger | H04L 67/306 |
| 2019/0308108 | A1* | 10/2019 | Bruzzo | A63F 13/332 |
| 2019/0314728 | A1* | 10/2019 | Sullivan | A63F 13/87 |
| 2019/0388792 | A1* | 12/2019 | Goslin | A63F 13/79 |
| 2020/0016495 | A1* | 1/2020 | Cruz | A63F 13/533 |
| 2020/0035026 | A1* | 1/2020 | Demirchian | H04N 21/235 |
| 2020/0139237 | A1* | 5/2020 | Butler | A63F 13/352 |
| 2020/0147486 | A1* | 5/2020 | Bleasdale-Shepherd | A63F 13/26 |
| 2020/0193476 | A1* | 6/2020 | Stephens | G06F 16/3334 |
| 2021/0397846 | A1* | 12/2021 | Chang | H04N 21/251 |

FOREIGN PATENT DOCUMENTS

| | | | | |
|---|---|---|---|---|
| WO | WO-2014025566 A1 * | 2/2014 | | G06F 17/30864 |
| WO | WO-2017218111 A1 * | 12/2017 | | A63F 13/49 |
| WO | WO-2017218305 A1 * | 12/2017 | | H04N 21/4122 |
| WO | WO-2018201855 A1 * | 11/2018 | | H04L 65/4076 |
| WO | WO-2019240811 A1 * | 12/2019 | | A63F 13/355 |

* cited by examiner

SYSTEMS AND METHODS FOR PROVIDING GAME-RELATED CONTENT

CROSS-REFERENCE TO RELATED APPLICATIONS

This application claims priority to U.S. Provisional Patent Application No. 62/855,744, filed on May 31, 2019 and entitled "SYSTEMS AND METHODS FOR PROVIDING GAME-RELATED CONTENT", all of which are incorporated in their entireties herein by reference.

FIELD OF THE INVENTION

The present technology relates to digital content provision. More particularly, the present technology relates to graphical user interfaces for providing digital, game-related content.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others.

SUMMARY

Various embodiments of the present technology can include systems, methods, and non-transitory computer readable media configured to receive gameplay information associated with a first user playing a game on a computing device. Game-related content is generated based on the gameplay information. The game-related content is published to an ephemeral content feed on a social networking system.

In an embodiment, the game-related content is published to an ephemeral content feed associated with the first user.

In an embodiment, the game-related content is published to an ephemeral content feed associated with the first user.

In an embodiment, the ephemeral content feed permits publication of content only by members of the group of users.

In an embodiment, the ephemeral content feed is automatically populated with game-related content based on gameplay from the group of users.

In an embodiment, the game-related content comprises at least one of: an image or a video pertaining to the gameplay information.

In an embodiment, the game-related content is automatically generated based on one or more achievements by the first user within the game.

In an embodiment, the game-related content comprises a call-to-action object that can be selected by a viewing user to access the game.

In an embodiment, the game-related content comprises a live video stream of the first user playing the game, and the game-related content is published to the ephemeral content feed as a live video stream.

In an embodiment, one or more viewing users viewing the live video stream are provided with an option to compete with the first user in playing the game.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
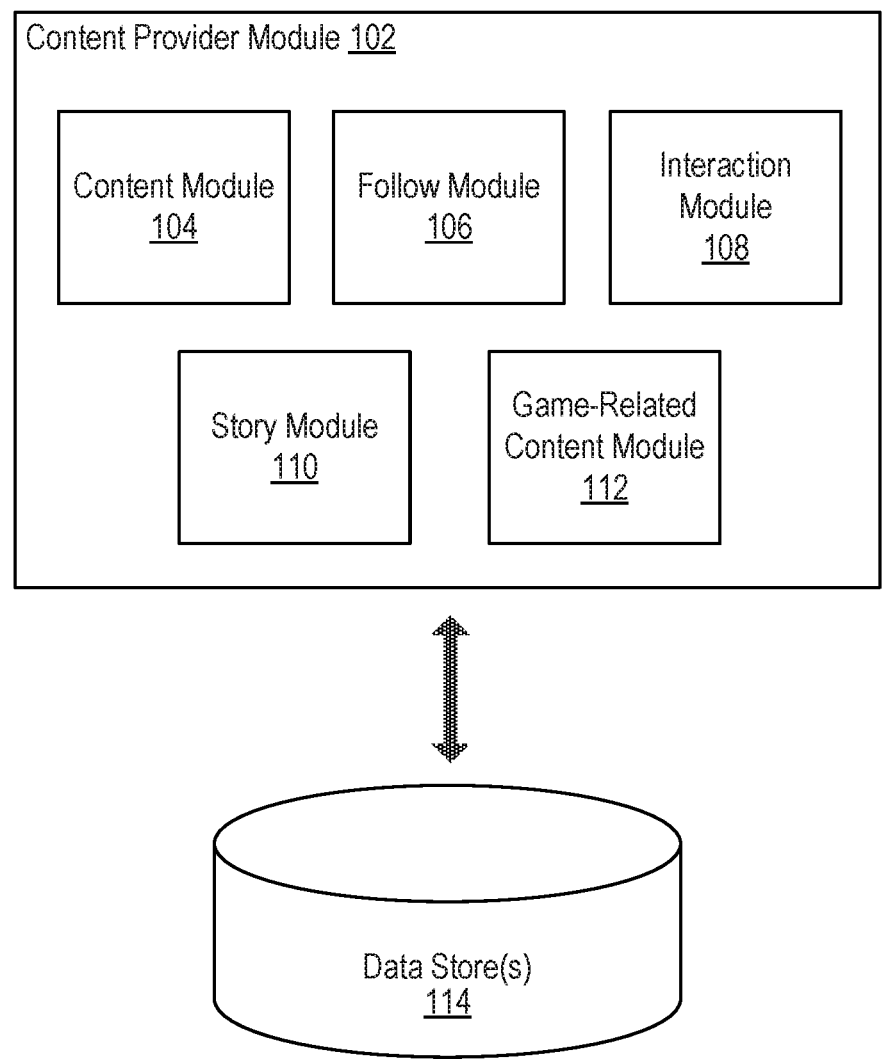
FIG. 1 illustrates an example system including a content provider module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Digital Game-Related Content

People often utilize computing devices (or systems) for a wide variety of purposes. Users can use their computing devices to, for example, interact with one another, access content, share content, and create content. In some cases, content items can include postings from members of a social networking system. Content items may include media content items, such as images or videos. Content items may be published to the social networking system or any other content platform for consumption by others.

People can also utilize computing devices to access and play electronic games, also known as video games. Certain electronic games may be online games. An online game may be a game that is either partially or primarily played by one or more users who communicate through the Internet or other data communication protocols. Online game sessions may be hosted or managed by a game server, which is typically one or more dedicated computers managed by a game publisher or other company. Users may initiate game sessions by directly accessing a web page of a third-party game server or may communicate with a server to exchange game information.

Gaming platforms (which may be a separate entity or part of a social networking system) have become a useful way to host various online games that users can engage in playing. Users can access a gaming platform through their client systems, such as a mobile device. The gaming platform may enable a user to play a game either independently or in collaboration with one or more other users.

A content platform, such as a social networking system, may provide users with one or more features or tools to access content available on the content platform. User experience with a content platform may be affected, either positively or negatively, by features and tools offered by the content platform. Intuitive and easy-to-use features may provide users with positive experiences while difficult or confusing features may result in frustrating experiences and may dissuade future utilization of the content platform by users. Furthermore, user experience with a content platform may also be affected by the quality and diversity of content that is posted to and available on the content platform. As such, it is an important consideration for digital content platforms and content providers to provide users with pleasing and easy-to-understand graphical user interfaces, features, and tools both for accessing content on the content platform and posting content to the content platform. As such, it can be appreciated that it is an important consideration for content providers to design new and improved features that effectively balance these interests. Conventional approaches may not be effective in addressing these and other problems arising in computer technology.

An improved approach rooted in computer technology overcomes the foregoing and other disadvantages associated with conventional approaches specifically arising in the realm of computer technology. In general, the presently disclosed technology can generate game-related content associated with gameplay of a user playing a game on a computing device. For example, game-related content can include a screenshot, an image, a video, a live stream video, or other content pertaining to a user's gameplay. In various embodiments, game-related content can be automatically generated based on various content generation criteria, or can be manually created by a user. The game-related content can be published to a social networking system for consumption by other users. In an embodiment, game-related content can be published as ephemeral content (also referred to herein as a "story") on the social networking system. More details relating to the disclosed technology are provided below.

FIG. 1 illustrates an example system 100 including a content provider module 102, according to an embodiment of the present technology. The content provider module 102 can be configured to provide users with access to content posted to a digital content platform, such as a social networking system. As shown in the example of FIG. 1, the content provider module 102 can include a content module 104, a follow module 106, an interaction module 108, a story module 110, and a game-related content module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102. For example, the data store 114 can store game-related content items. It is contemplated that there can be many variations or other possibilities.

The content module 104 can be configured to provide users with access to content that is available through a digital content platform, such as a social networking system. In some instances, this content can include content items posted in content feeds accessible through the social networking system, i.e., content posts. For example, the content module 104 can provide a first user with access to content posts through an interface that is provided by a software application (e.g., a social networking application) running on a computing device of the first user. The first user can also interact with the interface to post content posts to the social networking system. Such content posts may include text, images, audio, and videos, to name some examples. For example, the first user can submit a content post to be published through the social networking system. In some embodiments, the content post can include, or reference, one or more media content items, such as images, video, audio, and/or text.

In various embodiments, other users of the social networking system can access content posts posted by the first user. In one example, the other users can access the content posts by searching for the first user by user name through an interface provided by a software application (e.g., a social networking application, browser, etc.) running on their respective computing devices. In some instances, some users may want to see content posts posted by the first user in their respective content feed. To cause content posts posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content posts that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content posts posted by the first user are no longer included in the content feed of the user.

In some instances, users may want to interact with content posts posted to a social networking system. For example, a user may want to endorse, or "like", a content post. In this example, the user can select an option provided in the interface to like the desired content post. The interaction module 108 can determine when a user likes a given content post and can store information describing this relationship. The interaction module 108 can also determine when other forms of user interaction are performed and can store information describing the interaction (e.g., information describing the type of interaction, the identity of the user, the identity of the user that posted the content post, and the content post, to name some examples). For example, the user may want to post a comment in response to a content post. In this example, the user can select an option provided in the interface to enter and post the comment for the desired content post. The interaction module 108 can determine when a user posts a comment in response to a given content post and can store information describing this relationship. Other forms of user interaction can include emoji-based reactions to a content post (e.g., selecting an option that corresponds to a particular reaction emoji, e.g., happy, sad, angry, etc.), re-sharing a content post, and transmitting a message to a user pertaining to a particular content post, for example.

In some embodiments, the story module 110 can provide an option that allows users to post their content as ephemeral content, also referred to herein as "stories." In certain embodiments, each user may have a corresponding ephemeral content feed (or "story feed") in which the user can post ephemeral content. When a user's story feed is accessed by another user, the story module 110 can provide ephemeral content posted in the story feed to the other user for viewing. In certain embodiments, each user can have a story collection in which they can view stories posted by other users to their respective story feeds. As such, a user's story collection can include the story feeds of one or more users (e.g., one or more users that the user follows). In some embodiments, content posted in a user's story feed may be accessible by any user of the social networking system. In some embodiments, content posted in a user's story feed may only be accessible to followers of the user. In some embodiments, user stories (i.e., ephemeral content) posted to a user's story feed (i.e., a user's ephemeral content feed) expire after a pre-defined time interval (e.g., every 24 hours). In such embodiments, content posted as a story in a story feed is treated as ephemeral content that is made inaccessible once the pre-defined time interval has elapsed. In contrast, content posted in certain other content feeds, such as a user (or follower) primary content feed, can be treated as non-ephemeral content that remains accessible for a longer and/or an indefinite period of time.

The game-related content module 112 can be configured to generate game-related content pertaining to and/or associated with gameplay by a user playing a game (e.g., an electronic video game). Game-related content may be automatically generated and/or generated based on user input. In certain embodiments, game-related content can be published to a social networking system. In an embodiment, game-related content can be published as ephemeral content to one or more ephemeral content feeds on a social networking system. More details regarding the game-related content module 112 will be provided below with reference to FIG. 2.

Figure 2:
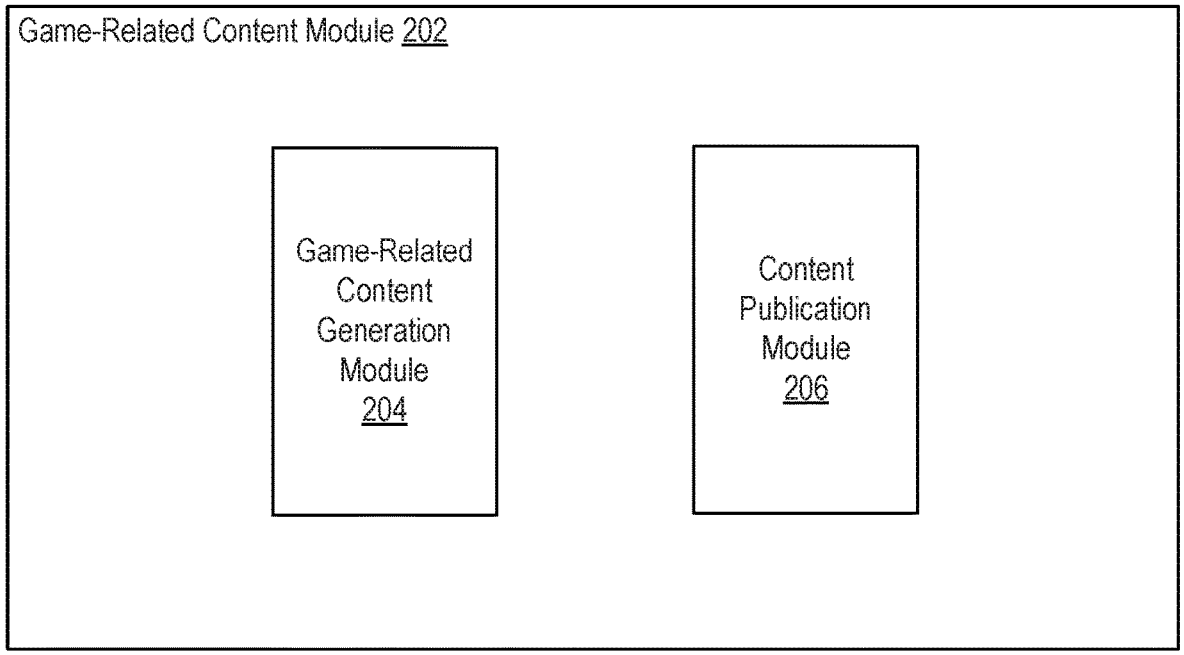
FIG. 2 illustrates an example game-related content module, according to an embodiment of the present technology.

FIG. 2 illustrates an example game-related content module 202, according to an embodiment of the present technology. In some embodiments, the game-related content module 112 of FIG. 1 can be implemented as the game-related content module 202. As shown in the example of FIG. 2, the game-related content module 202 can include a game-related content generation module 204 and a content publication module 206.

The game-related content generation module 204 can be configured to generate game-related content associated with and/or pertaining to gameplay of a user playing a game (e.g., an electronic video game). In an embodiment, the game-related content generation module 204 can receive gameplay information pertaining to and/or associated with gameplay of a user playing a game. Gameplay information can include, for example, audio/visual captures of a user's gameplay, information pertaining to particular events or achievements associated with a user's gameplay, and the like. The game-related content generation module 204 can utilize the gameplay information to generate game-related content. For example, game-related content may include screenshots of screens within a game as it is being played by a user, video captures of a game as it is being played by a user, live video streams of a game as it is being played by a user, other images and/or videos pertaining to a user's gameplay, and the like.

In certain embodiments, game-related content may be manually generated based on user input. For example, a user may manually capture a screenshot on his or her computing device as he or she is playing a game. In certain embodiments, game-related content may be automatically generated based on content generation criteria. For example, game-related content can be automatically generated based on game-related achievements. Some examples of game-related achievements can include reaching a particular level or progression point within a game, achieving a threshold score in a game, achieving a threshold ranking in a game leaderboard, setting a new personal record for score or progression in a game, and the like. When a user completes a particular achievement in a game, game-related content can be automatically generated based on the achievement (e.g., an image or a video pertaining to the achievement). Other events in a game may also trigger automatic generation of game-related content. For example, game-related content may be automatically generated if a user achieves a particular combination of moves in a game, or game-related content may be automatically generated on a periodic basis as a user plays a game (e.g., after a threshold period of time). In certain embodiments, a user may be provided with the option and/or opportunity to modify and/or edit automatically-generated game-related content. In certain embodiments, automatically-generated game-related content may be stored locally on a user computing device. In other embodiments, automatically-generated game-related content may be stored remotely from a user computing device (e.g., on a server associated with a game provider and/or a social networking system).

The content publication module 206 can be configured to publish game-related content generated by the game-related content generation module 204. In an embodiment, game-related content can be published to a social networking system. In an embodiment, game-related content can be published as ephemeral content to one or more ephemeral content feeds, as described above with reference to the story module 110 of FIG. 1.

In certain embodiments, game-related content may be manually published to a social networking system by a user, e.g., published based on explicit user input. For example, in certain embodiments, a user may be provided with a user interface for selecting certain images or videos from a user's camera roll to publish to a social networking system. Game-related content, such as game-related videos or images pertaining to a user's gameplay, can be presented along with other content items in a user's camera roll for selection by the user and publication to a social networking system. In another example, while a user is playing a game, a user may be provided with a prompt to publish game-related content to a social networking system. For example, when a user attains a particular achievement within the game, the user may be presented with an option to share game-related content pertaining to that achievement.

In certain embodiments, game-related content may be automatically published to a social networking system. For example, in certain embodiments, a user may opt in to automatic publication of game-related content pertaining to the user's gameplay. The user may define various user preferences for what types of game-related content may be automatically published. For example, the user may specify, using one or more user preferences, particular achievements such that when the user attains those achievements, the game-related content generation module 204 and the content publication module 206 can automatically generate and publish game-related content pertaining to those achievements without further user input.

As mentioned above, game-related content may be published to a social networking system as ephemeral content in one or more ephemeral content feeds. For example, each user may have his or her own ephemeral content feed to which the user can publish content. In certain embodiments, defined groups of users may also have ephemeral content feeds to which users can publish ephemeral content. For example, fans of a particular game (e.g., GAMEONE) may create a defined group (e.g., "FANS OF GAMEONE"), and one or more users may join the group to become members of the group. The group may have a group ephemeral content feed to which one or more members of the group can publish ephemeral content. If a user is a member of one or more groups, the user may be given the option to publish ephemeral content to his or her own ephemeral content feed as well as publishing ephemeral content to the group ephemeral content feeds of the one or more groups. In this way, members in a group can access the group ephemeral content stream to see the gaming progress and/or achievements of other members in the group. A user may be given the option to share game-related content to particular feeds (e.g., his or her main content feed, his or her ephemeral content feed, one or more group ephemeral content feeds) and/or to share game-related content with specific users.

In certain embodiments, game-related content can include one or more call-to-action objects. A viewing user viewing game-related content can select a call-to-action object to take a particular action. For example, if a first user publishes a first game-related content item pertaining to the first user's gameplay in a first game, a call-to-action object in the first game-related content item can be configured, when selected, to open an application or webpage associated with the first game so that a viewing user can also play the game.

Figure 3A:
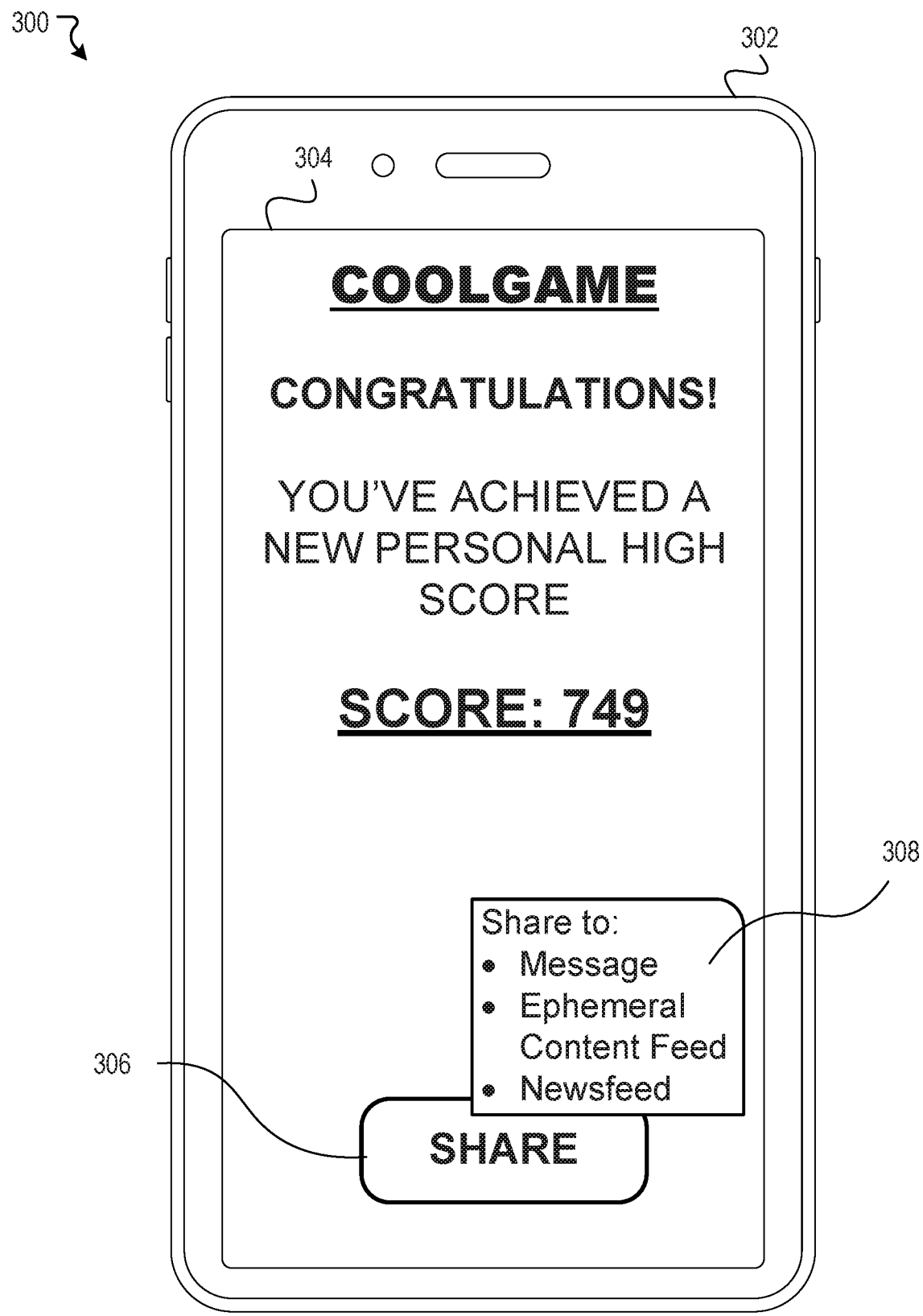
FIGS. 3A-3D illustrate example scenarios and interfaces associated with publishing game-related content, according to an embodiment of the present technology.

FIGS. 3A-3D illustrate an example scenario 300 to illustrate various features of the game-related content module 202, according to an embodiment of the present technology. In FIG. 3A, a first user is playing a first game called "COOLGAME" on a computing device 302. A user interface 304 indicates that the first user has achieved a new personal high score in the game. Based on this achievement, the user is provided with a selectable prompt 306 to share game-related content relating to this achievement. If the user selects the prompt 306, the user is presented with the option (box 308) to share game-related content in different ways, i.e., sharing in an instant message, sharing in an ephemeral content feed, or sharing in a primary content newsfeed.

Figure 3B:
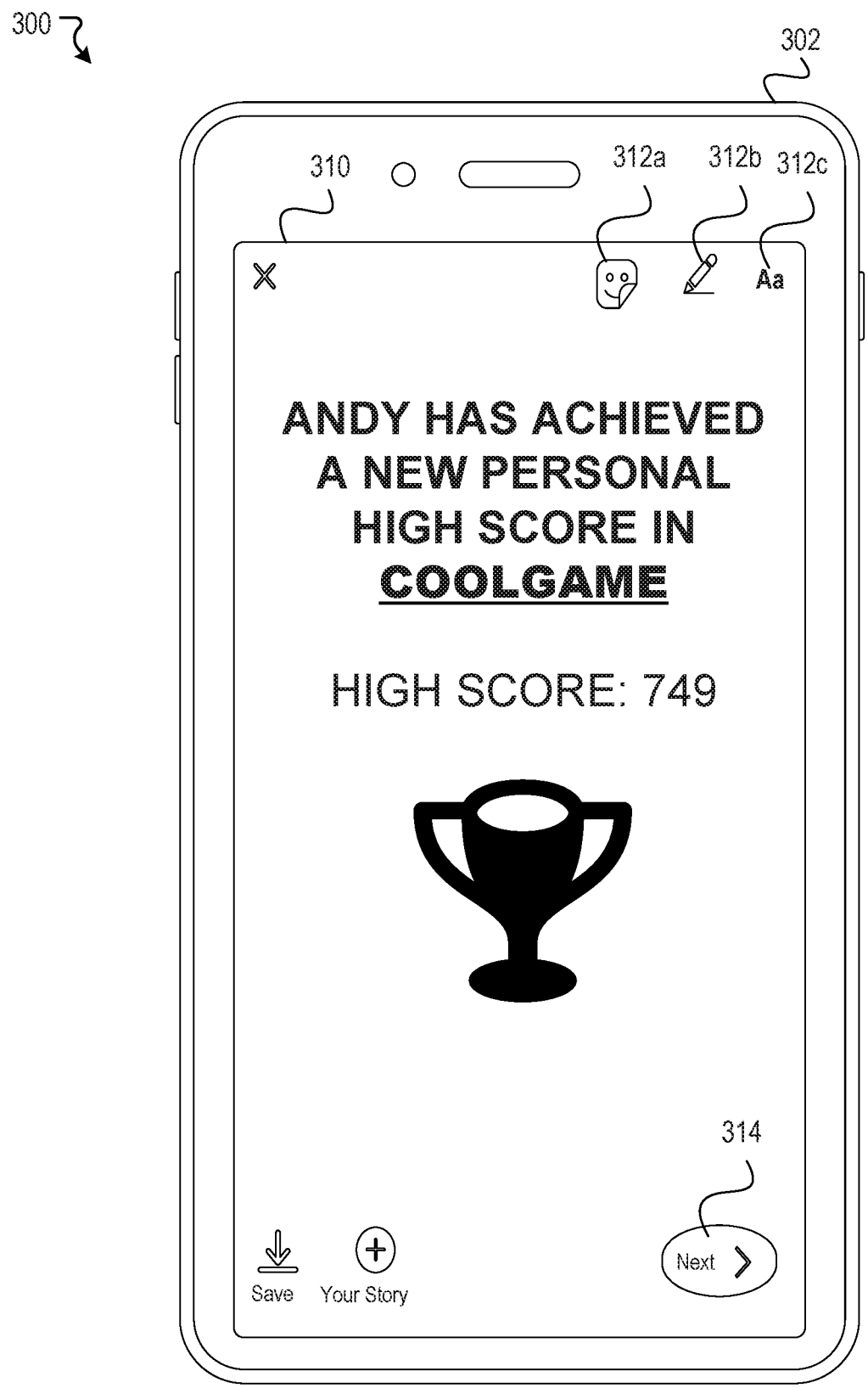

In FIG. 3B, the user has selected the option to share the game-related content in an ephemeral content feed. The user is presented with an automatically generated game-related content item, which is an image pertaining to the user's achievement in the game. The user is provided with a user interface 310 to modify the automatically generated game-related content item. For example, the user can add a sticker (button 312a), draw on the game-related content item (button 312b), or add text to the game-related content item (button 312c). When the user is satisfied with the game-related content item, the user can select a "Next" button 314.

Figure 3C:
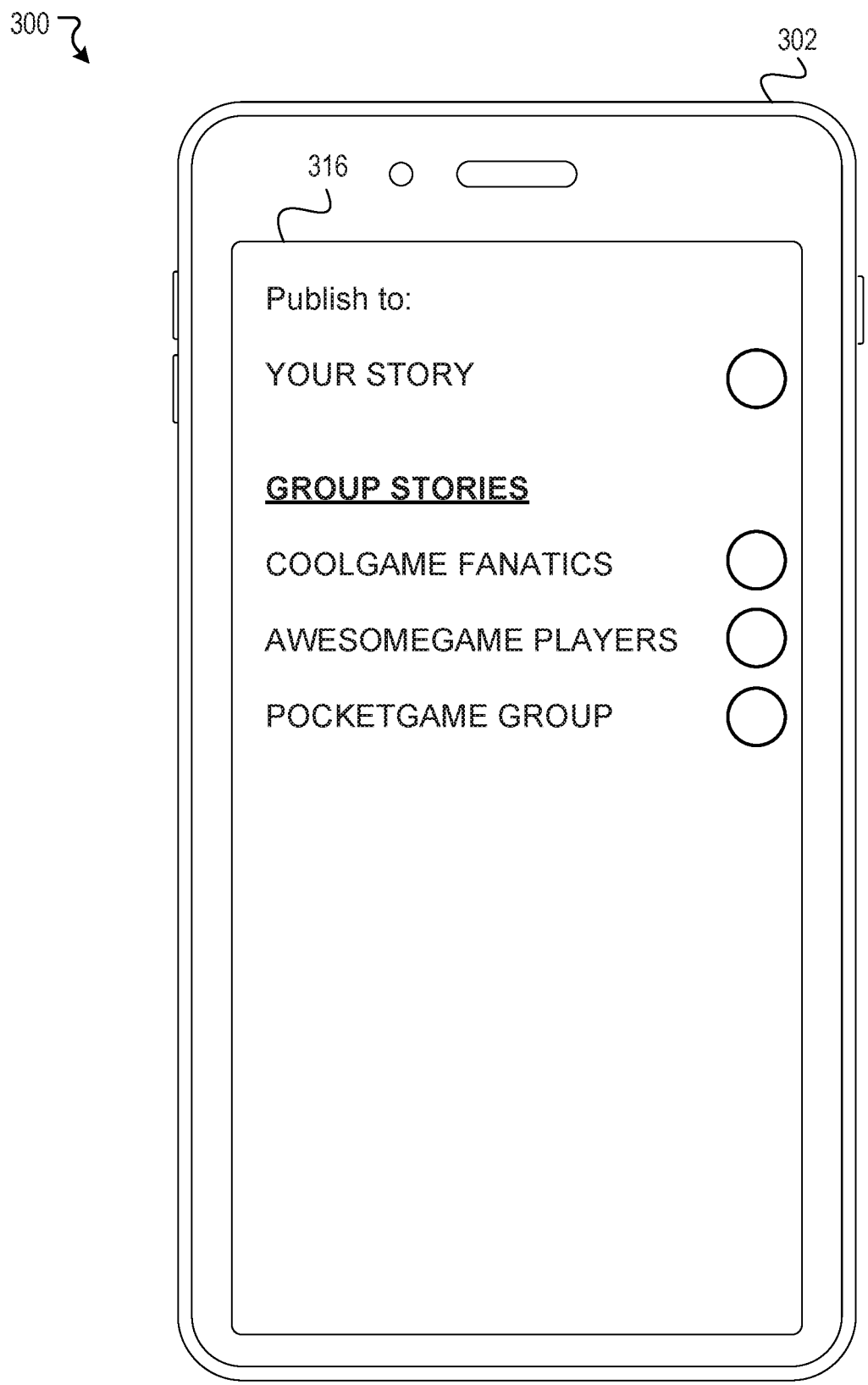

In FIG. 3C, the user has selected the "Next" button 314, and the user is presented with various ephemeral content story feeds to which the user can publish the game-related content item. In the example in FIG. 3C, the user can publish the game-related content item to his or her own ephemeral content feed. The user is also a member of three groups: COOLGAME FANATICS, AWESOMEGAME PLAYERS, AND POCKETGAME GROUP. As such, the user is also given the option to publish the game-related content item to the ephemeral content feeds associated with each of these groups.

Figure 3D:
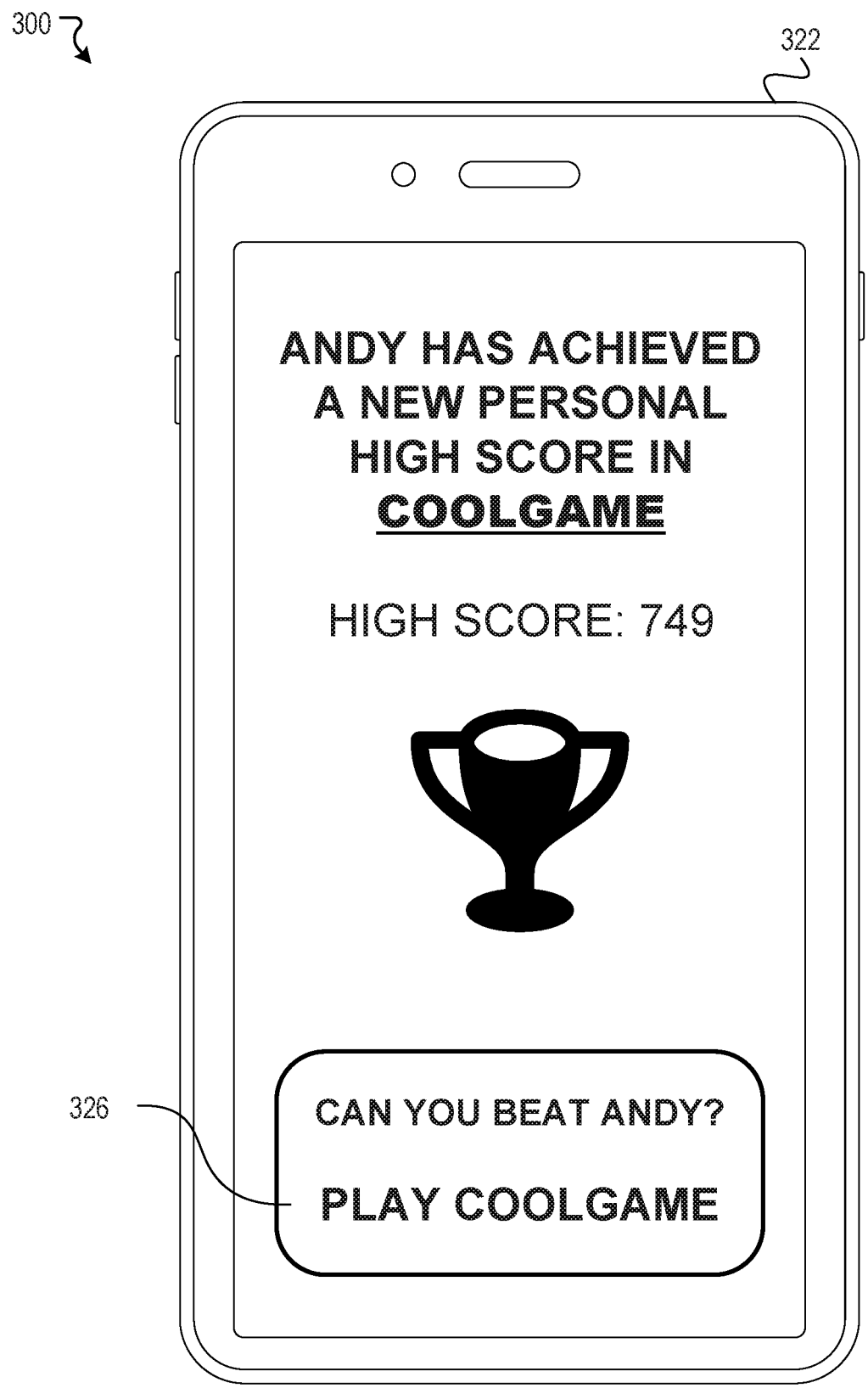

In FIG. 3D, a second user is utilizing his or her computing device 322 to view the game-related content item published by the first user in FIGS. 3A-3C. The game-related content item includes a call-to-action object 326 that has been added to the image published by the first user. The call-to-action object 326 can be selected by the second user. Selection of the call-to-action object 326 may cause the computing device 322 to open a webpage or application so that the second user can also play COOLGAME.

Returning to FIG. 2, in certain embodiments, game-related content published by the content publication module 206 may be published as a live video stream. For example, the content publication module 206 may provide a user with an option to play a game, and to publish a live video stream of the user's gameplay as the user plays the game. Other users on a social networking system can view the live video stream to view the user's gameplay in substantially real-time. In certain embodiments, a live video stream may be published to a user's story feed to be seen by other users. In certain embodiments, once a live video stream is terminated, a recording of the live video stream (or a portion thereof) may be automatically added to the user's story feed, and may be accessible in the user's story feed as ephemeral content for a predetermined period of time.

In certain embodiments, a live video stream of a user's gaming session may include an option (e.g., a call-to-action object) that can allow a viewing user to participate in the user's gaming session (e.g., to compete with the user). For example, if a first user initiates a live video stream of his or her gaming session, and the first user is playing a basketball game, other users viewing the live video stream can select a call-to-action object to also play the basketball game and see if they can achieve a higher score than the first user. A leaderboard showing the scores of one or more users participating in the first user's gaming session can be presented within the live video stream. Many variations are possible.

Figure 4A:
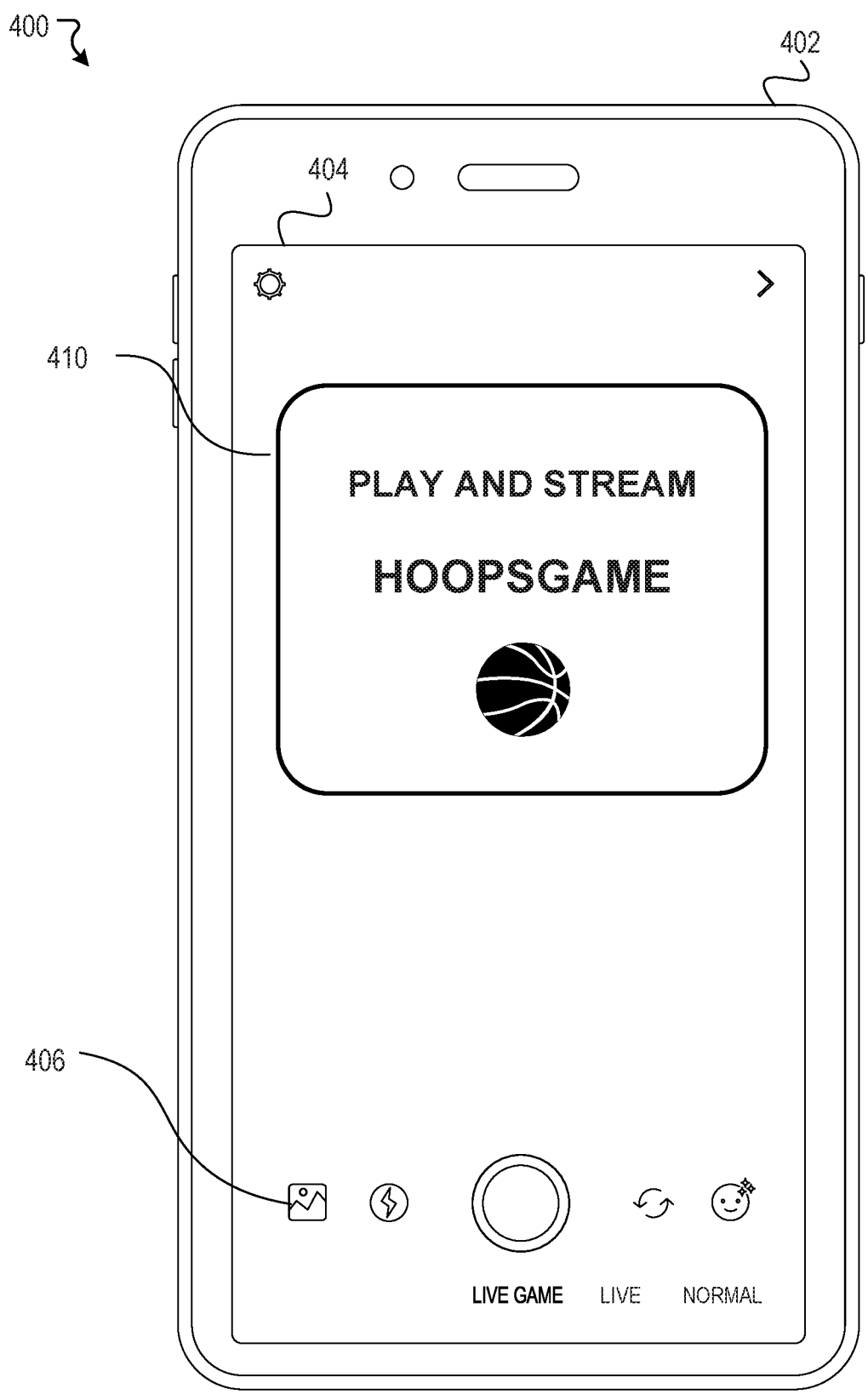
FIGS. 4A-4B illustrate various example scenarios and interfaces associated with publishing live video streams of game-related content, according to various embodiments of the present technology.
Figure 4B:
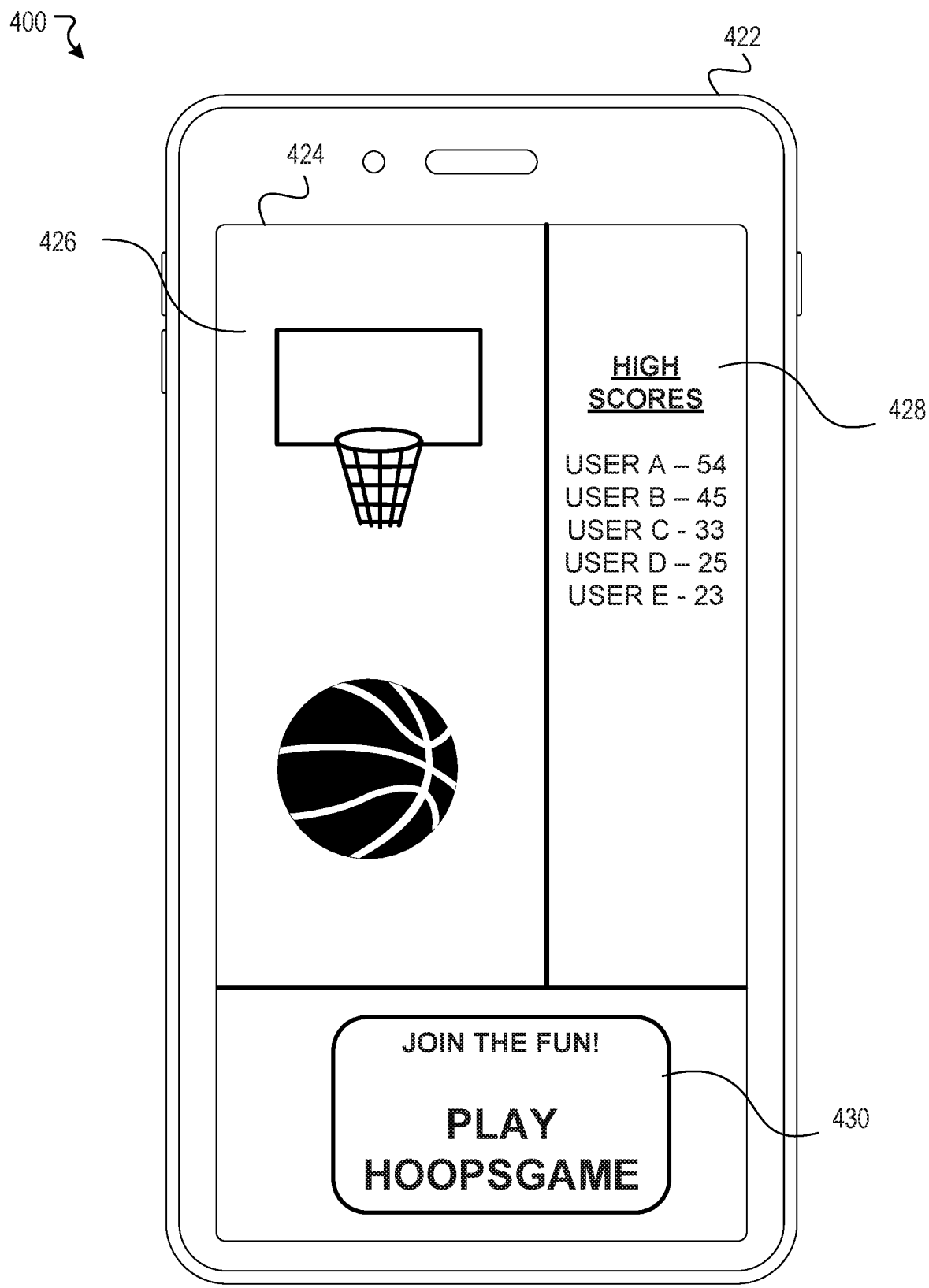

FIGS. 4A and 4B illustrate an example scenario 400, according to an embodiment of the present technology. In FIG. 4A, a first user is utilizing a computing device 402 to publish content to a social networking system. A user interface 404 may include the option to publish content from a camera roll by selecting a first option 406. The user interface may also include an option 410 for the user to upload a live video stream of the user's gameplay in a game. While the example scenario 400 includes the option to upload live gameplay in only one game (called "HOOPSGAME"), the user interface 404 may list multiple games that the user can choose from.

In FIG. 4B, a second user is utilizing a second computing device 422 to view the live video stream of the first user playing HOOPSGAME. A user interface 424 can include a first portion 426 which presents the live video stream of the first user's gameplay. A call-to-action object 430 may allow the second user to also play HOOPSGAME. For example, selection of the call-to-action object 430 may cause an application or webpage to open on the computing device 422 so that the second user can play HOOPSGAME. In certain embodiments, selecting the call-to-action object 430 may cause the second user to participate in the first user's gaming session, such that the second user's scores or results may be shared within the first user's live video stream. For example, a third portion 428 may present a ranked list of user scores for other users that are participating in the first user's gaming session. In the example scenario 400, Users A, B, C, D, and E are viewing users viewing the first user's gaming session in the live video stream. Users A, B, C, D, and E have also participated in the first user's gaming session. In certain embodiments, viewing users can only see the first user's gameplay within the live video stream because the first user initiated the gaming session, but viewing users can see scores and results for other viewing users that participate in the first user's gaming session.

Figure 5:
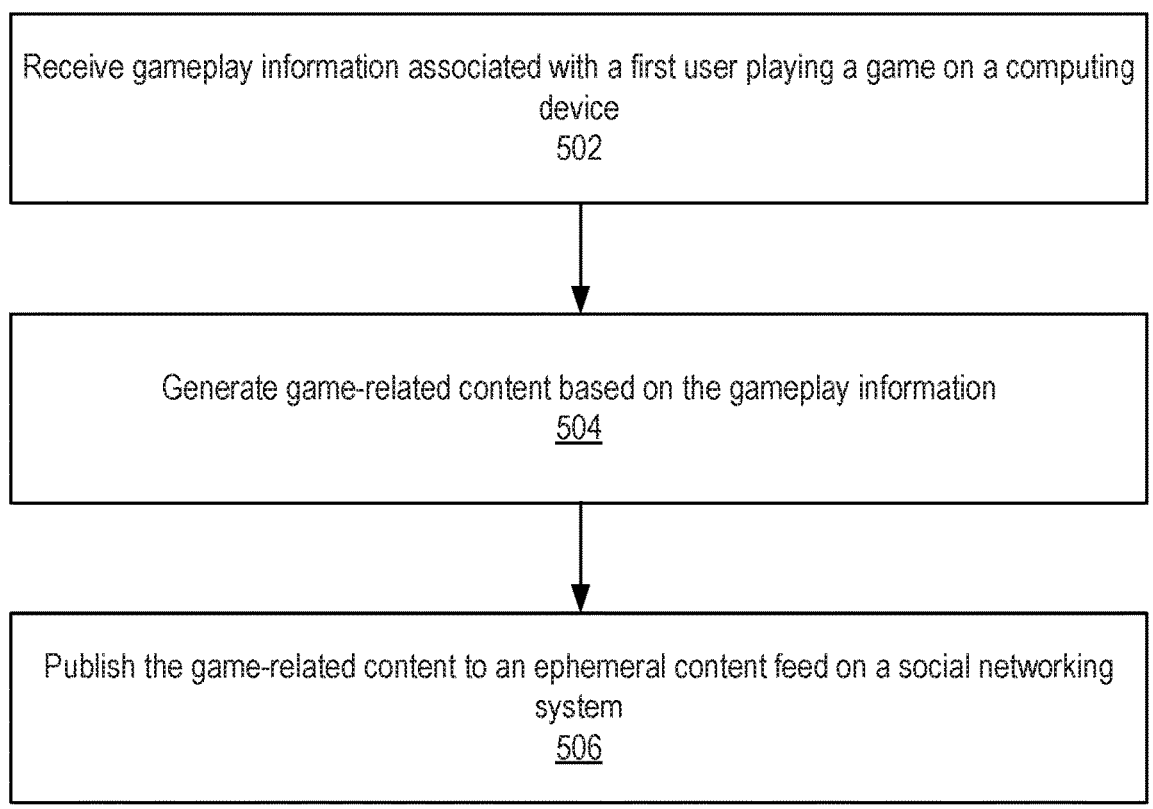
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive gameplay information associated with a first user playing a game on a computing device. At block 504, the example method 500 can generate game-related content based on the gameplay information. At block 506, the example method 500 can publish the game-related content to an ephemeral content feed on a social networking system.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
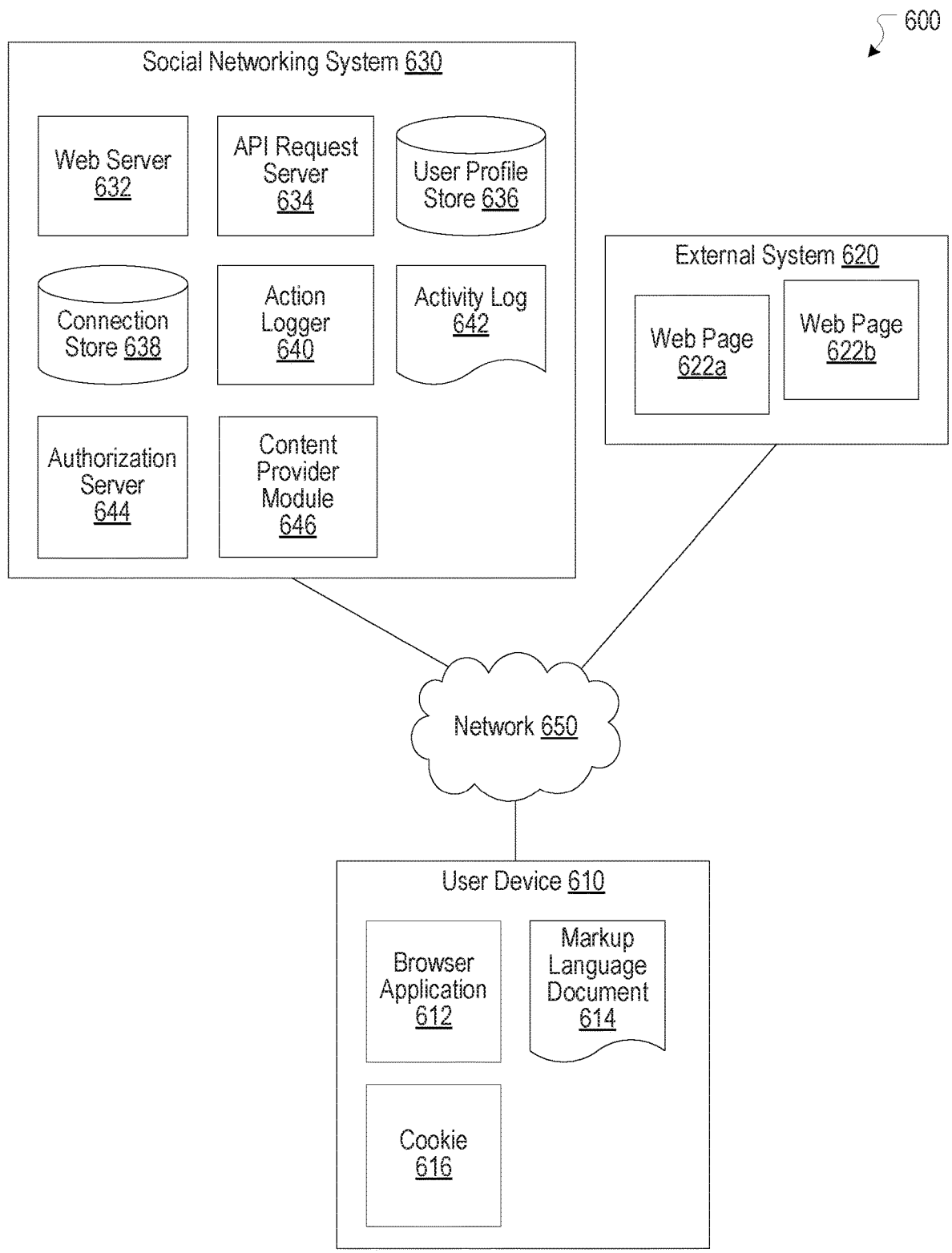
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. As discussed previously, it should be appreciated that there can be many variations or other possibilities. For example, in some embodiments, one or more functionalities of the content provider module 646 can be implemented in the user device 610. As discussed previously, it should be appreciated that there can be many variations or other possibilities.

Hardware Implementation

Figure 7:
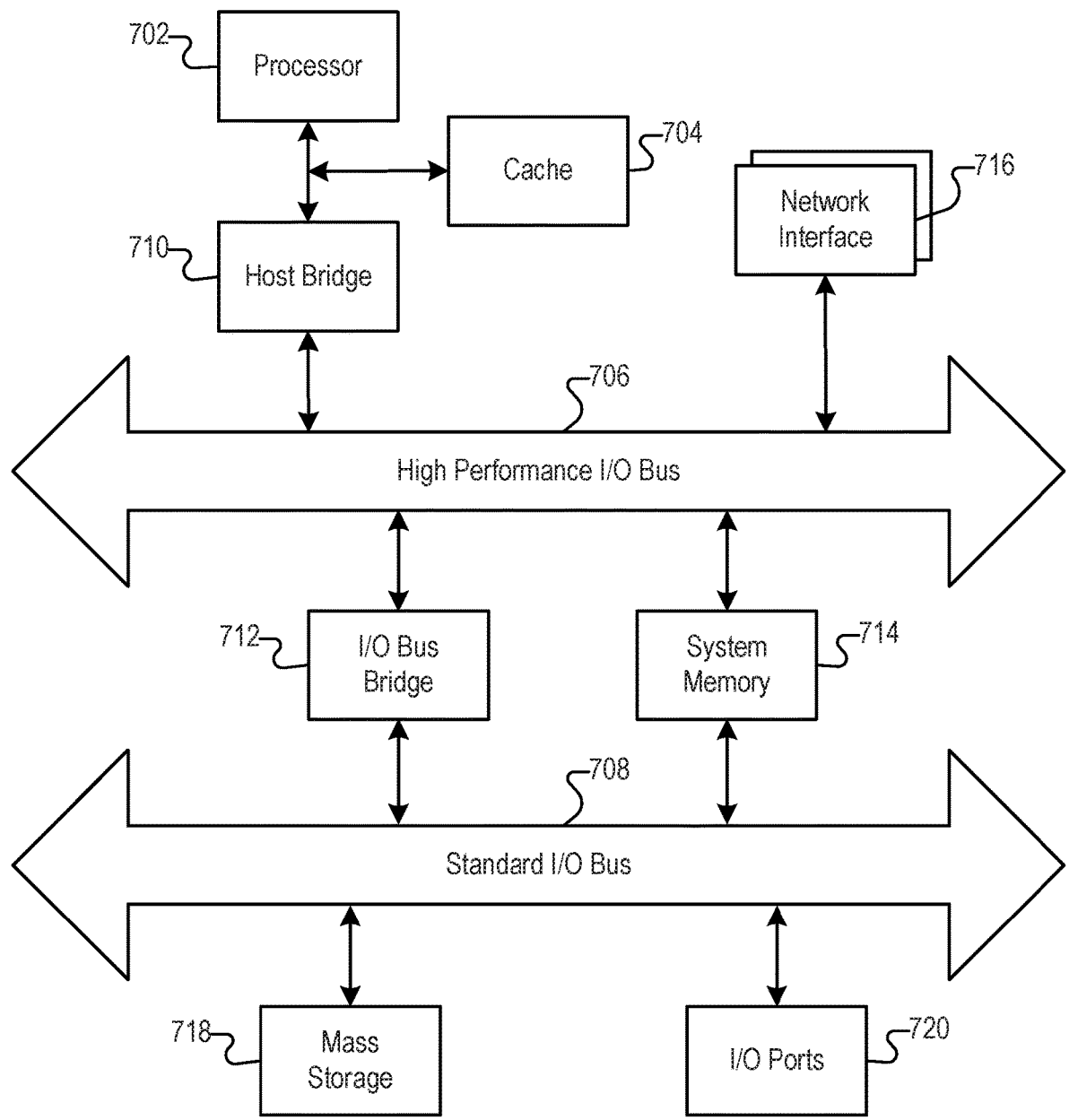
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a user preference provided by a first user, wherein the user preference specifies a game-related achievement that occurs in a game to trigger automatic generation of game-related content for the game;
    receiving, by the computing system, first gameplay information associated with the first user of a gaming session playing the game on a first computing device;
    determining, by the computing system, the first user completed the game-related achievement in the game based on the first gameplay information;
    generating, by the computing system, the game-related content based on the first gameplay information, wherein the game-related content includes a live video stream of the gaming session and a first option to join the gaming session;
    providing, by the computing system, a second option to modify the game-related content prior to provision on an ephemeral content feed;
    providing, by the computing system, the game-related content to the ephemeral content feed;
    causing, by the computing system, a second computing device of a second user to play the game and join the gaming session based on a selection of the first option to join the gaming session; and
    providing, by the computing system, second gameplay information associated with the second user as part of the live video stream of the gaming session.

2. The computer-implemented method of claim 1, wherein the ephemeral content feed is associated with the first user and only includes content posted by the first user.

3. The computer-implemented method of claim 1, wherein the ephemeral content feed is associated with a group of users.

4. The computer-implemented method of claim 3, wherein the ephemeral content feed permits publication of content only by members of the group of users.

5. The computer-implemented method of claim 3, wherein the ephemeral content feed is automatically populated with game-related content based on gameplay from the group of users.

6. The computer-implemented method of claim 1, wherein the game-related content comprises at least one of: an image or a video pertaining to the gameplay information.

7. The computer-implemented method of claim 1, wherein the game-related achievement includes achievement of at least one of: a level or progression point, a threshold score, a threshold ranking, a personal record, or a combination of moves.

8. The computer-implemented method of claim 1, wherein the causing the second computing device of the second user to play the game comprises causing an application or a webpage to open on the second computing device to play the game.

9. The computer-implemented method of claim 1, further comprising:
providing, by the computing system, a recording of the live video stream to a feed associated with the first user.

10. The computer-implemented method of claim 9, wherein the recording of the live video stream is provided to the feed associated with the first user for a predetermined period of time.

11. A system comprising:
at least one processor; and
a memory storing instructions that, when executed by the at least one processor, cause the system to perform:
receiving a user preference provided by a first user, wherein the user preference specifies a game-related achievement that occurs in a game to trigger automatic generation of game-related content for the game;
receiving first gameplay information associated with the first user of a gaming session playing the game on a first computing device;
determining the first user completed the game-related achievement in the game based on the first gameplay information;
generating the game-related content based on the first gameplay information, wherein the game-related content includes a live video stream of the gaming session and a first option to join the gaming session;
providing a second option to modify the game-related content prior to provision on an ephemeral content feed;
providing the game-related content to the ephemeral content feed;
causing a second computing device of a second user to play the game and join the gaming session based on a selection of the first option to join the gaming session; and
providing second gameplay information associated with the second user as part of the live video stream of the gaming session.

12. The system of claim 11, wherein the ephemeral content feed is associated with the first user and only includes content posted by the first user.

13. The system of claim 11, wherein the ephemeral content feed is associated with a group of users.

14. The system of claim 13, wherein the ephemeral content feed permits publication of content only by members of the group of users.

15. The system of claim 13, wherein the ephemeral content feed is automatically populated with game-related content based on gameplay from the group of users.

16. A non-transitory computer-readable storage medium including instructions that, when executed by at least one processor of a computing system, cause the computing system to perform:
receiving a user preference provided by a first user, wherein the user preference specifies a game-related achievement associated with automatic generation of game-related content for a game;
receiving first gameplay information associated with the first user of a gaming session playing e the game on a first computing device;
determining the first user completed the game-related achievement based on the first gameplay information;
generating the game-related content based on the first gameplay information, wherein the game-related content includes a live video stream of the gaming session and a first option to join the gaming session;
providing a second option to modify the game-related content prior to provision on an ephemeral content feed;
providing the game-related content to the ephemeral content feed;
causing a second computing device of a second user to play the game and join the gaming session based on a selection of the first option to join the gaming session; and
providing second gameplay information associated with the second user as part of the live video stream of the gaming session.

17. The non-transitory computer-readable storage medium of claim 16, wherein the ephemeral content feed is associated with the first user and only includes content posted by the first user.

18. The non-transitory computer-readable storage medium of claim 16, wherein the ephemeral content feed is associated with a group of users.

19. The non-transitory computer-readable storage medium of claim 18, wherein the ephemeral content feed permits publication of content only by members of the group of users.

20. The non-transitory computer-readable storage medium of claim 18, wherein the ephemeral content feed is automatically populated with game-related content based on gameplay from the group of users.

* * * * *